United States Patent

[11] 3,575,481

| [72] | Inventor | Graydon A. Phlieger, Jr.<br>325 McLeod Drive, Cocoa, Fla. 32922 |
|---|---|---|
| [21] | Appl. No. | 1,081 |
| [22] | Filed | Jan. 7, 1970 |
| [45] | Patented | Apr. 20, 1971 |

[54] FISHING CONSOLE
3 Claims, 6 Drawing Figs.

[52] U.S. Cl. .................................................. 312/228, 312/229, 312/237
[51] Int. Cl. ..................................................A47b 77/06, A47f 9/00, A47b 83/00
[50] Field of Search............................................ 312/228, 107, 237, 240

[56] References Cited
UNITED STATES PATENTS

| 892,831 | 7/1908 | Hogan | 312/228X |
| 2,867,471 | 1/1959 | Coon | 312/228X |
| 2,886,395 | 5/1959 | Cahn | 312/229X |

Primary Examiner—Paul R. Gilliam

ABSTRACT: This invention relates to the combination of a plastic-wood fishing console to be used particularly on small boats and yachts or the like. Said console having an area upon which fish may be washed and cleaned. Said console having a water supply, a cold storage area, and an area for storage of fishing tools and tackle.

3,575,481

INVENTOR.
Graydon A. Phlieger Jr.

FISHING CONSOLE

This invention relates to a novel and compact fishing console, specifically designed to afford more utility, convenience and safety; and to bring about more efficient use of inherently restricted space on small boats and yachts.

Fishing and boating have always been closely related sports, but have not been organized and blended together to provide the utmost in utility, efficiency, safety and enjoyment to the participant.

In the past, preparing bait and cleaning fish on a boat has been done in various ways and sometimes resulted in the spreading of fish trimmings and residue on floors and decks which can cause them to become slippery. Slippery floors constitute a safety hazard especially in rough water situations.

Large boats have cold storage areas which, if used for storage of bait and fish, provide no method of preventing fish odors from being absorbed by other foods in the refrigerated area.

Smaller boats either have no provisions for cold storage or must carry on board an icebox which takes up additional space.

In the storage of a portable water supply, smaller boats have usually had no built-in provisions and water is carried on board in containers and placed in areas which are either easy to get to and, consequently, in the way or out of the way and difficult to get to.

At the present, fishing tackle is usually carried on board each fishing trip, or stored on board in many different types of boxes which are scattered over the boat and usually in the way during the fishing trip. The boxes' fold-open layer construction makes it difficult to get to their contents. The boxes frequently tip and spill, and fishing tackle is easily tangled.

The main object of this invention is, therefore, to provide a complete compact unit fabricated from plastic and used with or without an internal wood frame, which will satisfy all the requirements of the fisherman, in a small space; and at the same time create more usable space within the limited confines of small boats and yachts.

Another object of this invention is to provide a self-contained, recessed area for cutting bait, rinsing and cleaning fish.

Still another object of this invention is to contain fish trimmings and residue, and keep them from areas which will create safety hazards.

Another object of this invention is to provide a facility for cold storage of bait and fresh caught fish separate from other food storage areas.

Yet another object of this invention is to make available an organized easily accessible secure space for the storage of fishing tools and tackle.

The nature of the invention and its other objects and novel features will be more fully understood and appreciated from the following description of a preferred embodiment of the invention shown in the accompanying drawings in which.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the invention.

And while there is stated the primary field of utility of the invention, it remains obvious that it may be employed in any other capacity wherein it may be found applicable.

Figure 1:
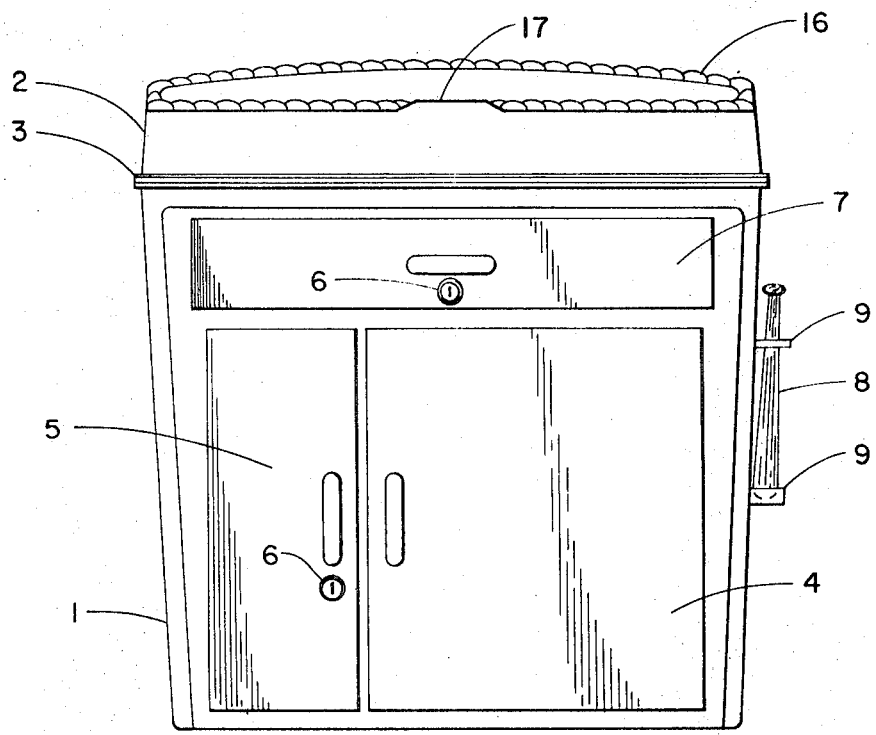
FIG. 1 is a front view of the console.

In the accompanying drawings and in the following specifications, the same reference characters are used to designate the same parts and elements throughout; and in which FIG. 1, numeral 1, indicates the bottom portion of the cabinet structure of the console and numeral 2 indicates the top portion of the cabinet structure. Both top and bottom are made from plastic and reinforced, if desired, with an internal wooden frame. The bottom portion 1 and top portion 2 are fastened securely together and trimmed with a bumper strip 3. The bottom portion 1 is formed in such a manner as to accept and provide a cold storage unit 4, a water and storage area concealed by a hinged door 5, and also a sliding tackle storage drawer 7. The hinged door 5 and sliding tackle storage drawer 7 are secured by locks 6. A fish club 8 is attached to the shell 1 in a convenient location by means of a conventional rack holder 9.

Figure 2:
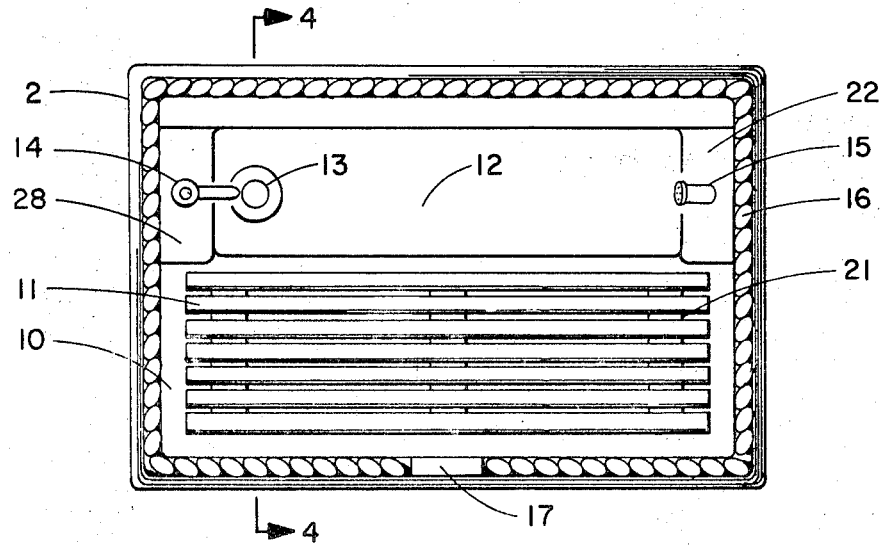
FIG. 2 is a top view of FIG. 1 showing the placement of the fish-cleaning facilities.

FIG. 2 is a top view of the console showing the top portion 2 configured in a way so as to provide a recessed pan area 10 which will accept a slotted cutting board 11. A still further recessed area 12 serves as a catch basin and temporary storage for cleaning water and has an overboard drain 13 with a stainless steel strainer and stopper combination (not shown). Fresh water is supplied through a hand pump or tap 14 mounted on raised deck 28 and salt water for the majority of the fish-cleaning and-rinsing operation is supplied through an extendable, retractable spray nozzle 15 mounted on raised deck 22 which will reach all of recessed area 10 and cutting board 11. The raised ridge of top portion 2 is bounded by a decorative molded plastic or fiberglas rope effect trim 16. A flat surface 17 provides a location for an identification tag, which may describe the manufacturer's name, part number, serial number, and if desired the owner's name.

Figure 3:
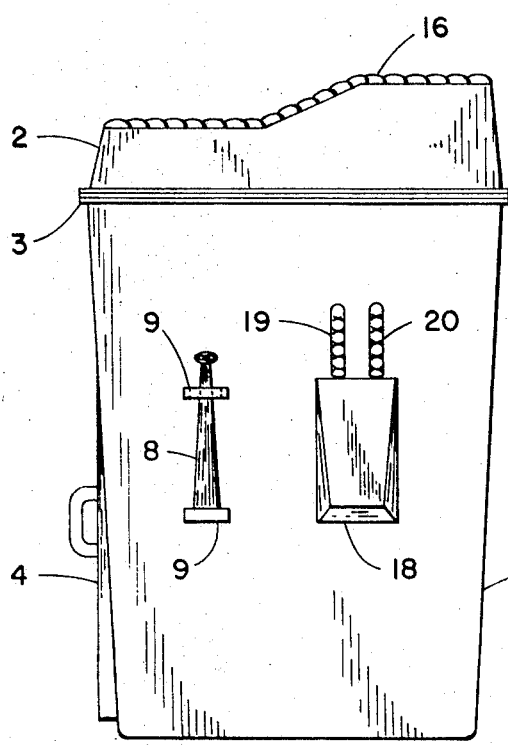
FIG. 3 is a side elevation view of FIG. 1 showing the mounting of the fish-cleaning implements.

FIG. 3 is a side view of the console showing the placement of the fish club 8 and its rack holder 9 and also a conventional holder 18 for a cleaning knife 19 and a filet knife 20.

Figure 4:
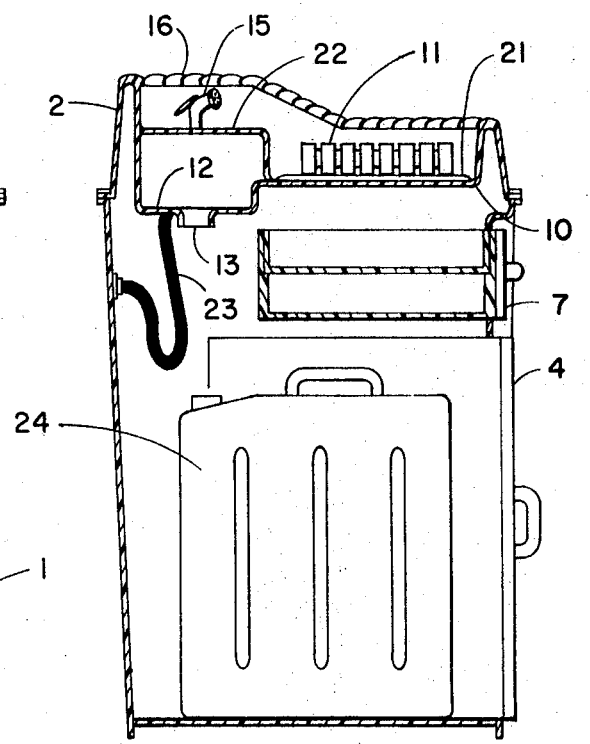
FIG. 4 is a sectional view taken along line 4—4 in FIG. 2.

FIG. 4 shows recessed area 10 formed in such a manner as to provide raised ridges 21 which support the slotted cutting board 11 and allows fish scales, trimmings, and rinse water to flow under cutting board 11 and into catch basin 12. Slotted cutting board 11 is also removable for cleaning. Raised deck 22 provides a mounting surface for water spray nozzle 15 which is attached to extendable retractable hose 23. Fresh water is stored in container 24 which is connected by a hose (not shown) to hand pump 14 shown on FIG. 2.

Figure 5:
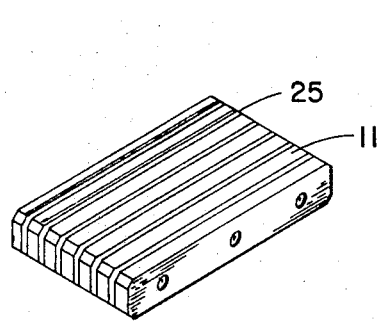
FIG. 5 is a pictorial view of the slotted cutting board shown in FIG. 2 and FIG. 4.

FIG. 5 shows the cutting board 11 as being removable from recessed area 10, shown in FIG. 4, and so constructed that slots 25 provide easy drainage of rinse water.

Figure 6:
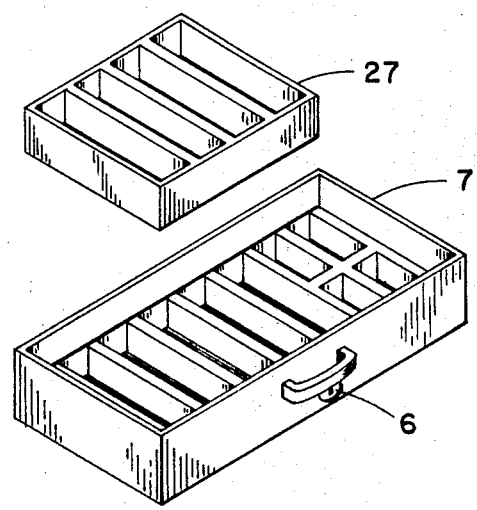
FIG. 6 is an exploded pictorial view of the fishing tackle storage drawer of FIG. 4.

FIG. 6 shows the configuration of the separate compartments for fishing tackle storage drawer 7 which also contains a recessed laterally sliding drawer 27. The movement of sliding drawer 27 from one side to the other provides easy access to tackle lower unit 7.

I claim:

1. A self-contained console for use in one centrally confined location, comprising:
   a. an upstanding cabinet structure;
   b. a top portion forming a part of said upstanding cabinet structure;
   c. said top portion having a raised ridge around the periphery thereof;
   d. a pan portion operably associated with said raised ridge;
   e. said pan portion having forward and rearward recessed areas;
   f. a bottom portion having
      a front surface having a door providing access to a recess for accommodating a cold storage unit; a drawer for fishing equipment and a separate area for storing a container;
   g. supporting means for accessories attached to said cabinet structure;

h. a cutting board and having draining means associated therewith removably supported adjacent one of said recessed areas, said one area having a drain therein;

i. means connected to said drain and extending from said cabinet whereby refuse from said board is removed;

raised deck portions closely adjacent said ridge and on opposite sides of one of said recessed areas, j. a water tap supported by one of said deck portions; and k. a spray nozzle supported by the other of said deck portions.

2. A console described in claim 1 constructed from materials so as to provide:

a. an outer shell of reinforced plastic for weather protection;

b. an internal wood frame; and c. Tackle and tool storage areas with vacuum-formed plastic trays comprised of individual compartments for separate storage of fishing tools and tackle.

3. A console according to claim 1, wherein a decorative molded rope is mounted on said ridge.